(12) United States Patent
Zhang et al.

(10) Patent No.: US 9,350,429 B2
(45) Date of Patent: May 24, 2016

(54) SIGNAL TRANSMISSION METHOD, BASE STATION AND SYSTEM FOR MULTIPLE-USER MULTIPLE-INPUT MULTIPLE-OUTPUT SYSTEM

(71) Applicant: Huawei Technologies Co., Ltd., Shenzhen (CN)

(72) Inventors: Lei Zhang, Shenzhen (CN); Yi Wang, Shenzhen (CN); Jiayin Zhang, Shenzhen (CN); Yuqing Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/687,345

(22) Filed: Apr. 15, 2015

(65) Prior Publication Data

US 2015/0222338 A1 Aug. 6, 2015

Related U.S. Application Data

(63) Continuation of application No. PCT/CN2013/073329, filed on Mar. 28, 2013.

(30) Foreign Application Priority Data

Oct. 16, 2012 (CN) .......................... 2012 1 0391318

(51) Int. Cl.
*H04B 7/04* (2006.01)
*H04B 7/06* (2006.01)
(Continued)

(52) U.S. Cl.
CPC ............ *H04B 7/0452* (2013.01); *H04B 7/0626* (2013.01); *H04L 25/03891* (2013.01); *H04W 72/1226* (2013.01); *H04W 72/1231* (2013.01)

(58) Field of Classification Search
CPC .............. H04B 7/0452; H04B 7/0626; H04W 72/1226; H04W 72/1231
See application file for complete search history.

(56) References Cited

U.S. PATENT DOCUMENTS

2007/0165521 A1    7/2007   Malik et al.
2009/0279623 A1   11/2009   Wu et al.
(Continued)

FOREIGN PATENT DOCUMENTS

CN           1898889 A      1/2007
WO   WO 2012/015737 A1   2/2012

OTHER PUBLICATIONS

Maddah-Ali, Mohammad Ali et al., "Completely Stale Transmitter Channel State Information is Still Very Useful," Information Theory, IEEE Transactions on Information Theory, vol. 58, No. 7, 2011, 15 paqes.*

Adhikary, Ansuman et al., "Multi-User MIMO with outdated CSI: Training, Feedback and Scheduling," Proc. of the 49th Allerton Conference, IEEE, 2011, 8 pages.

(Continued)

*Primary Examiner* — Ross Varndell
(74) *Attorney, Agent, or Firm* — Brinks Gilson & Lione

(57) ABSTRACT

The present invention provides a signal transmission method for a multiple-user multiple-input multiple-output system, includes: in a signal sending time slot, sending a signal to user terminals through each antenna via preset subcarriers in a signal sending time slot; sending a first public information signal to the user terminals through each antenna via the preset subcarriers in a public information sending time slot. According to the technical solution provided by the present invention, the problem that signal transmission delay of a multiple-user multiple-input multiple-output system where a channel changes rapidly is too long is solved.

16 Claims, 7 Drawing Sheets

(51) Int. Cl.
*H04L 25/03* (2006.01)
*H04W 72/12* (2009.01)

(56) References Cited

U.S. PATENT DOCUMENTS

2014/0092950 A1* 4/2014 Khayrallah .......... H04B 7/0697 375/227
2014/0161091 A1* 6/2014 Adhikary et al. .... H04B 7/0452 370/329

OTHER PUBLICATIONS

Maddah-Ali, Mohammad Ali et al., "Completely Stale Transmitter Channel State Information is Still Very Useful," Information Theory, IEEE Transactions on Information Theory, vol. 58, No. 7, 2011, 15 pages.

Yune, Tae-Won et al, "Single Carrier Frequency-Domain Equalization with Transmit Diversity over Mobile Multipath Channels," IEICE Transactions on Communications, vol. E89-B, No. 7, Jul. 2006, pp. 2050-2060.

* cited by examiner

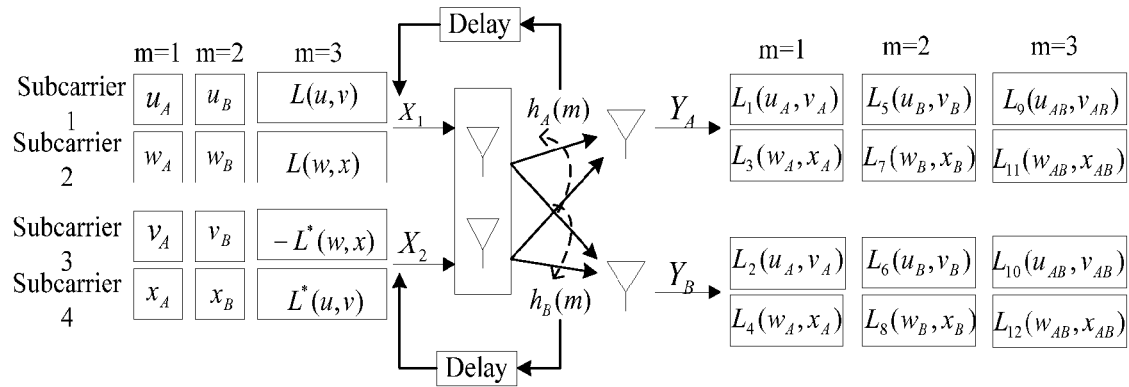

FIG. 3

In a first signal sending time slot, sending two signals $U_A$ and $W_A$ to user terminal A through antenna 1, and sending two other signals $V_A$ and $X_A$ to the user terminal A through antenna 2, via two different preset subcarriers — 401

In a second signal sending time slot, sending two signals $U_B$ and $W_B$ to user terminal B through antenna 1, and sending two other signals $V_B$ and $X_B$ to the user terminal B through antenna 2, via two different preset subcarriers — 402

In a third signal sending time slot, sending public information signals L(u, v) and L(w, x) to the user terminals A and B through antenna 1 via the two different preset subcarriers — 403

In the third signal sending time slot, sending public information signals –L*(u, v) and –L*(w, x) to user terminals A and B through the antenna 2 via the two different preset subcarriers by using a space frequency block code (SPFC) — 404

FIG. 4

SIGNAL TRANSMISSION METHOD, BASE STATION AND SYSTEM FOR MULTIPLE-USER MULTIPLE-INPUT MULTIPLE-OUTPUT SYSTEM

CROSS-REFERENCE TO RELATED APPLICATIONS

This application is a continuation of International Application No. PCT/CN2013/073329, filed on Mar. 28, 2013, which claims priority to Chinese patent application No. 201210391318.8, filed on Oct. 16, 2012, both of which are hereby incorporated by reference in their entireties.

TECHNICAL FIELD

The present invention relates to the field of communication technologies and, in particular, to a signal transmission method, a base station and a system for a multiple-user multiple-input multiple-output system.

BACKGROUND

In the present 4G standard process, multiple-input multiple-output system (MIMO) technology is always considered as a key technology. Introduction of multiple antennas enable the system to achieve higher diversity gain and multiplexing gain, thereby greatly increasing spectrum efficiency of the communication system and capacity of communication channels and the system. MIMO system includes single-user multiple-input multiple-output system (SU-MIMO) and multiple-user multiple-input multiple-output system (MU-MIMO). In MU-MIMO, different user's data can be transmitted in the same time-frequency resource block, thus increasing data transmission rate, however, there are interferences among multiple users. Currently, in order to get multi-user gain in MU-MIMO and eliminate the interferences among multiple user terminals, some methods are usually adopted, such as user terminals feedback Channel State Information (CSI) to enable a transmitting-end pre-coding and multiple users scheduling strategy. In recently published articles, a solution named as MAT scheme is provided.

| | | DoF | |
|---|---|---|---|
| K | SU-MIMO | MAT scheme (based on outdated CSI) | MU-MIMO based on complete CSI |
| 1 | 1 | 1 | 1 |
| 2 | 1 | 1.33 | 2 |
| 4 | 1 | 1.92 | 4 |
| 8 | 1 | 2.94 | 8 |
| 16 | 1 | 4.73 | 16 |
| 64 | 1 | 13.51 | 64 |

The above solution can enhance degree of freedom (DoF) by using outdated Channel State Information. The article concludes a result by using the outdated Channel State Information which is fed back: in a MU-MIMO system with K transmitting antennas and K single-antenna users, the greatest degree of freedom can be gotten is: DoF=K/(1+½+⅓+ . . . +1/K)>1. As shown in the above table, Comparison are performed for different K values.

But for a K×K MU-MIMO system, if the MAT scheme is adopted, there will be problems that signal transmission delay of the multiple user multiple input multiple output system where a channel changes rapidly is too long, where the delayed time gets longer with increasing of the amount of antennas, and no extra gain of the system can be gotten by using spare antennas. There is no valid solution for the above problems in the prior art.

SUMMARY

Embodiments of the present invention provide a signal transmission method for a multiple-user multiple-input multiple-output system, a base station and a system, so as to solve the problem that signal transmission delay of a multiple-user multiple-input multiple-output system where a channel changes rapidly is too long.

In a first aspect, a signal transmission method for a multiple-user multiple-input multiple-output system is provided. The method includes:

sending a signal to user terminals through each antenna via preset subcarriers in a signal sending time slot;

sending a first public information signal to the user terminals through each antenna via the preset subcarriers in a public information sending time slot;

where a quantity of the preset subcarriers is the same as that of the antennas.

In a first possible implementation of the first aspect, a second possible implementation of the first aspect is provided, where, the multiple-user multiple-input multiple-output system includes a 2×2 system, the preset subcarriers corresponding to the quality of the antennas includes two subcarriers, the sending the signal to the user terminals through each antenna via preset subcarriers in the signal sending time slot, includes:

sending two signals $U_A$ and $W_A$ to a user terminal A through an antenna 1, and sending two other signals $V_A$ and $X_A$ to the user terminal A through an antenna 2, via two different preset subcarriers in a first signal sending time slot;

sending two signals $U_B$ and $W_B$ to a user terminal B through the antenna 1, and sending two other signals $V_B$ and $X_B$ to the user terminal B through the antenna 2, via two different preset subcarriers in a second signal sending time slot.

In the second possible implementation of the first aspect, a third possible implementation of the first aspect is provided, where, the sending the first public information signal to the user terminals through each antenna via the preset subcarriers in the public information sending time slot includes:

sending first public information signals L(u, v) and L(w, x) to user terminals A and B through the antenna 1, via the two different preset subcarriers in a third signal sending time slot.

In the second possible implementation of the first aspect, a fourth possible implementation of the first aspect is provided, where, sending second public information signals −L*(u, v) and −L*(w, x) to the user terminals A and B through the antenna 2 via the two different preset subcarriers by using a space frequency block code SPFC in the third signal sending time slot.

In the second possible implementation of the first aspect, a first possible implementation of the first aspect is provided, where the multiple-user multiple-input multiple-output system includes a 3×3 system, the preset subcarriers corresponding to the quality of the antennas includes three subcarriers, the sending the signal to the user terminals through each antenna via preset subcarriers in the signal sending time slot, includes:

in a first signal sending time slot, sending three signals $U_A$, $U_B$ and $U_C$ to three user terminals through an antenna 1 via three different preset subcarriers, sending three signals $V_A$, $V_B$ and $V_C$ to the three user terminals through an antenna 2 via subcarriers which are the same as that on the antenna 1, and sending three signals $W_A$, $W_B$ and $W_C$ to the three user terminals through an antenna 3 via subcarriers which are the same as that on the antenna 1.

In the second possible implementation of the first aspect, a second possible implementation of the first aspect is provided, where the sending the first public information signal to the user terminals through each antenna via the preset subcarriers in the public information sending time slot, includes:

sending three public combination information signals $L_2(U_A, V_A, W_A)+L_4(U_B, V_B, W_B)$, $L_3(U_A, V_A, W_A)+L_7(U_C, V_C, W_C)$ and $L_6(U_C, V_C, W_C)+L_8(U_C, V_C, W_C)$ to three user terminals through the antenna 1 via three different preset subcarriers in a second signal sending time slot.

In the third possible implementation of the first aspect, a first possible implementation of the first aspect is provided, where the multiple-user multiple-input multiple-output system includes a 3×3 system with asymmetric antenna configuration, the preset subcarriers corresponding to the quality of the antennas includes three subcarriers, the sending the signal to the user terminals through each antenna via preset subcarriers in the signal sending time slot, includes:

sending three signals $U_A$, $V_A$ and $W_A$ to a user terminal A through three antennas in a first signal sending time slot;

sending three signals $U_B$, $V_B$ and $W_B$ to a user terminal B through the three antennas in a second signal sending time slot;

sending feedback information $L_4(U_B, V_B, W_B)$, $L_5(U_B, V_B, W_B)$ and $L_3(U_A, V_A, W_A)$ of the user terminals A and B through the three antennas in a third signal sending time slot.

In a second aspect, a base station is provided. The base station includes:

a first sending unit, configured to send a signal to user terminals through each antenna via preset subcarriers in a signal sending time slot;

a second sending unit, configured to send a first public information signal to the user terminals through each antenna via the preset subcarriers in a public information sending time slot;

where a quantity of the preset subcarriers is the same as that of the antennas.

In a first possible implementation of the second aspect, the first sending unit includes:

a first sending sub-unit, configured to send two signals $U_A$ and $W_A$ to user terminal A through antenna 1, and send two other signals $V_A$ and $X_A$ to the user terminal A through antenna 2, via two different preset subcarriers in a first signal sending time slot;

a second sending sub-unit, configured to send two signals $U_B$ and $W_B$ to user terminal B through antenna 1, and send two other signals $V_B$ and $X_B$ to the user terminal B through antenna 2, via two different preset subcarriers in a second signal sending time slot.

In the first possible implementation of the second aspect, a second possible implementation of the second aspect is provided, where, the second sending unit includes:

a third sending sub-unit, configured to send first public information signals L(u, v) and L(w, x) to the user terminals A and B through the antenna 1 via the two different preset subcarriers in a third signal sending time slot.

In the second possible implementation of the second aspect, a third possible implementation of the second aspect is provided, where, the second sending unit includes:

a fourth sending sub-unit, configured to send second public information signals −L*(u, v) and −L*(w, x) to the user terminals A and B through the antenna 2 via the two different preset subcarriers by using a space frequency block code (SPFC) in the third signal sending time slot.

In the second possible implementation of the second aspect, the first sending unit includes:

a first sending sub-unit, configured to, in a first signal sending time slot, send three signals $U_A$, $U_B$ and $U_C$ to the three user terminals through an antenna 1 via three different preset subcarriers, send three signals $V_A$, $V_B$ and $V_C$ to the three user terminals through an antenna 2 via subcarriers which are the same as that on the antenna 1, and send three signals $W_A$, $W_B$ and $W_C$ to the three user terminals through an antenna 3 via subcarriers which are the same as that on the antenna 1.

In the second possible implementation of the second aspect, a second possible implementation of the second aspect is provided, where, the second sending unit includes:

a second sending sub-unit, configured to, in a second signal sending time slot, send three public information signals $L_2(U_A, V_A, W_A)+L_4(U_B, V_B, W_B)$, $L_3(U_A, V_A, W_A)+L_7(U_C, V_C, W_C)$ and $L_6(U_C, V_C, W_C)+L_8(U_C, V_C, W_C)$ to the three user terminals through the antenna 1 via the three different preset subcarriers.

In the third possible implementation of the second aspect, the first sending unit includes:

a first sending sub-unit, configured to send three signals $U_A$, $V_A$ and $W_A$ to the user terminal A through three antennas in a first signal sending time slot; and a second sending sub-unit, configured to send three signals $U_B$, $V_B$ and $W_B$ to the user terminal B through the three antennas in a second signal sending time slot.

In the third possible implementation of the second aspect, a fourth possible implementation of the second aspect is provided, where, the second sending sub-unit includes:

a third sending sub-unit, configured to send feedback $L_4(U_B, V_B, W_B)$, $L_5(U_B, V_B, W_B)$ and $L_3(U_A, V_A, W_A)$ of the user terminals A and B through the three antennas in a third signal sending time slot.

The following benefits can be obtained by implementing embodiments of the present invention: a signal is sent to user terminals through each antenna via preset subcarriers in a signal sending time slot, and a first public information signal is sent to the user terminals through each antenna via the preset subcarriers in a public information sending time slot, thus signal transmission delay of a multiple-user multiple-input multiple-output system where a channel changes rapidly can be effectively reduced; the idle antennas can be used to realize SFBC or other antenna diversity, thereby improving the system performance; and the MAT scheme for asymmetric antenna configuration increases flexibility of the system configuration.

BRIEF DESCRIPTION OF DRAWINGS

To describe the technical solutions in embodiments of the present invention more clearly, the following briefly introduces the accompanying drawings needed for describing the embodiments. Apparently, the accompanying drawings in the following description illustrate merely some embodiments of the present invention, and persons of ordinary skill in the art may still derive other drawings from these accompanying drawings without creative effort.

FIG. 3 is a 2×2 MU-MIMO system according to the present invention;

FIG. 4 is a schematic flowchart of a second specific implementation of the signal transmission method for a multiple-user multiple-input multiple-output system provided in FIG. 1;

DESCRIPTION OF EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that are obtained by those skilled in the art based on embodiments of the present invention all fall within the protection scope of the present invention.

Figure 1:
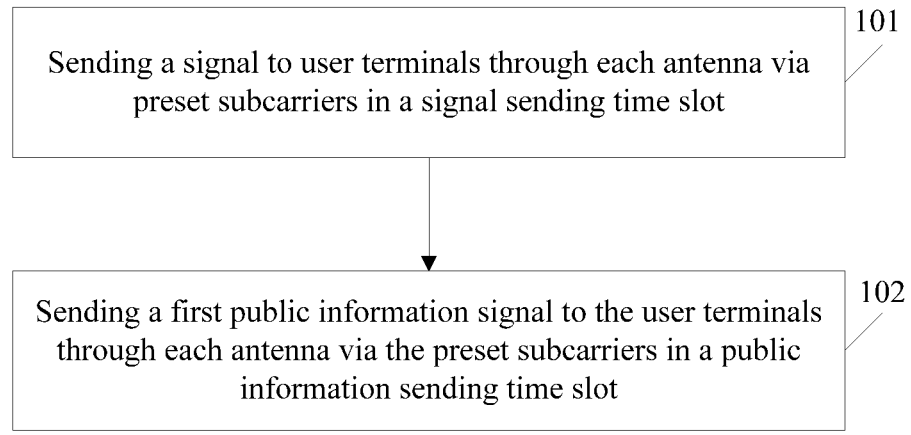
FIG. 1 is a schematic flowchart of a signal transmission method for a multiple-user multiple-input multiple-output system according to a first embodiment of the present invention.

Please refer to FIG. 1 which is a schematic flowchart of a signal transmission method for a multiple-user multiple-input multiple-output system according to an embodiment of the present invention. As shown in FIG. 1, the signal transmission method for a multiple-user multiple-input multiple-output system may include the following steps:

101. Sending a signal to user terminals through each antenna via preset subcarriers in a signal sending time slot;

102. Sending a first public information signal to the user terminals through each antenna via the preset subcarriers in a public information sending time slot.

For a K×K MU-MIMO system, send a signal to user terminals through each antenna via preset subcarriers in a signal sending time slot, and send a first public information signal to the user terminals through each antenna via the preset subcarriers in a public information sending time slot. Where, a quantity of the preset subcarriers is the same as that of the antennas.

As a possible implementation, for a 2×2 MU-MIMO system, an eNodeB has two antennas corresponding to two user terminals A and B, where each of the two user terminals has one antenna respectively. The 2×2 MU-MIMO system includes two signal sending time slots, and signals are sent to the user terminals via two preset subcarriers in each signal sending time slot. Two subcarriers are involved in each signal sending time slot, when there are two signals to be sent, the signals are simultaneously sent via two different sub-frequencies in one signal sending time slot.

As a possible implementation, for a 3×3 MU-MIMO system, an eNodeB has three antennas corresponding to three user terminals A, B and C, where each of the three user terminals has one antenna respectively, the 3×3 MU-MIMO system includes two signal sending time slots, and the signals are sent to the user terminals via three preset subcarriers in each signal sending time slot. When there are three signals to be sent, the signals are simultaneously sent via three different sub-frequencies in one signal sending time slot.

As a possible implementation manner, corresponding to a 3×3 multiple-user multiple-input multiple-output system with asymmetric antenna configuration, the base station includes three antennas corresponding to two user terminals A and B, where the user terminal A has 2 antennas, and the user terminal B has one antenna, and the quantity of preset subcarriers is the same as that of the antennas.

It needs to be noted that, in a K×K MU-MIMO system, the K×K system is not limited to a 2×2 system and a 3×3 system, but also includes systems greater than the 3×3 system.

Figure 2:
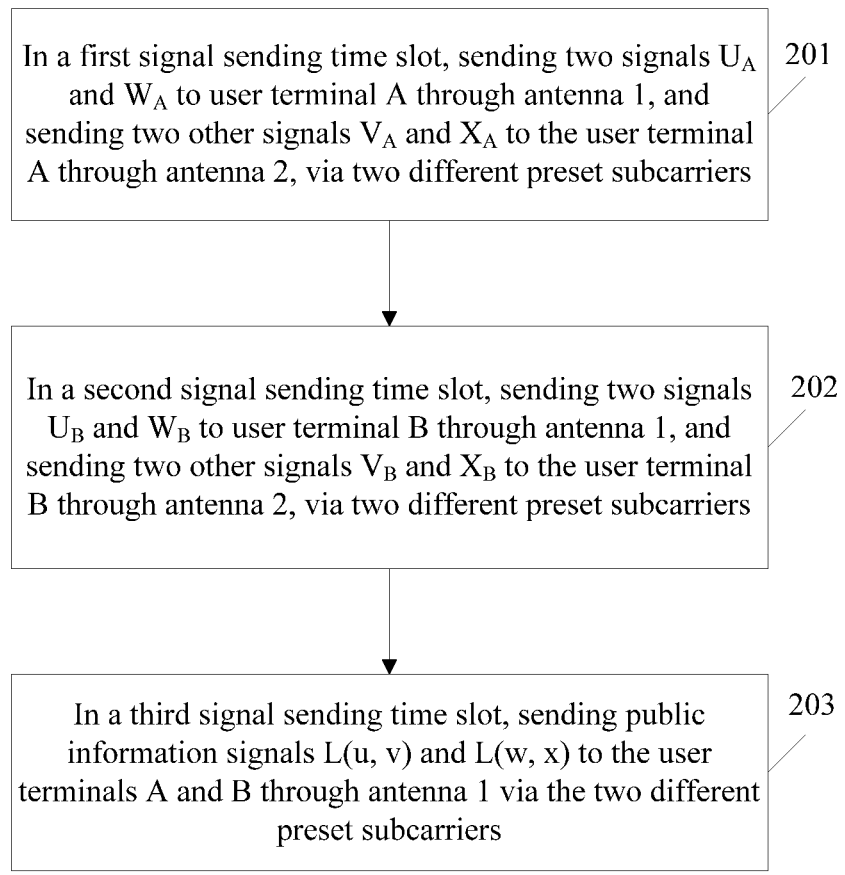
FIG. 2 is a schematic flowchart of a first implementation of the transmission method for a multiple-user multiple-input multiple-output system as shown in FIG. 1.

Referring to FIG. 2, the present embodiment is a first specific implementation of the signal transmission method for a multiple-user multiple-input multiple-output system provided in FIG. 1. The signal transmission method for a multiple-user multiple-input multiple-output system includes:

201. In a first signal sending time slot, sending two signals $U_A$ and $W_A$ to user terminal A through antenna 1, and sending two other signals $V_A$ and $X_A$ to the user terminal A through antenna 2, via two different preset subcarriers.

202. In a second signal sending time slot, sending two signals $U_B$ and $W_B$ to user terminal B through antenna 1, and sending two other signals $V_B$ and $X_B$ to the user terminal B through antenna 2, via two different preset subcarriers.

203. In a third signal sending time slot, sending public information signals L(u, v) and L(w, x) to the user terminals A and B through antenna 1 via the two different preset subcarriers.

For example, refer to the 2×2 MU-MIMO system as shown in FIG. 3. As a possible implementation, for a 2×2 MU-MIMO, an eNodeB has two antennas corresponding to two user terminals A and B, where each of the two user terminals has one antenna respectively. The 2×2 MU-MIMO includes two signal sending time slots, and signals are send to the user terminals via two preset subcarriers in each signal sending time slot. Two subcarriers are involved in each signal sending time slot, when there are two signals to be sent, the signals are simultaneously sent via two different sub-frequencies in one signal sending time slot, where, the quantity of preset subcarriers is the same as that of the antennas.

In a first signal sending time slot, send two signals $U_A$ and $W_A$ to the user terminal A through antenna 1, and send two other signals $V_A$ and $X_A$ to the user terminal A through antenna 2, via two different preset subcarriers.

In a second signal sending time slot, send two signals $U_B$ and $W_B$ to the user terminal B through the antenna 1, and send two other signals $V_B$ and $X_B$ to the user terminal B through the antenna 2, via two different preset subcarriers.

In a third signal sending time slot, send public information signals L(u, v) and L(w, x) to the user terminals A and B through the antenna 1 via two different preset subcarriers.

Correspondingly, in a first signal receiving time slot, the user terminal A receives information $L_1(U_A, V_A)$ and $L_3(W_A, X_A)$ belonging to the user terminal A itself on the two different preset subcarriers, meanwhile, the user terminal B receives information $L_2(U_A, V_A)$ and $L_4(W_A, X_A)$ related to the user terminal A on the two different preset subcarriers.

In a second signal receiving time slot, the user terminal A receives information $L_5(U_B, V_B)$ and $L_7(W_B, X_B)$ related to the user terminal B on the two different preset subcarriers, meanwhile, the user terminal B receives information $L_6(U_B, V_B)$ and $L_8(W_B, X_B)$ belonging to the user terminal B itself on the two different preset subcarriers.

In a third signal receiving time slot, the user terminals A and B receive public information $L_9(U_{AB}, V_{AB})$, $L_{11}(W_{AB}, X_{AB})$ and $L_{10}(U_{AB}, V_{AB})$, $L_{12}(W_{AB}, X_{AB})$ via the two different preset subcarriers.

According to the present invention, eight signals are sent to the user terminals A and B via two subcarriers by using three signal sending time slots, that is, before the eight signals of the user terminals A and B being decoded, only three time slots at least need to be delayed, and delay of decoding data by the user terminal is less than that in the MAT scheme.

Referring to FIG. 4, the present embodiment is a second specific implementation of the signal transmission method for multiple-user multiple-input multiple-output system provided in FIG. 1. The signal transmission method for multiple-user multiple-input multiple-output system includes:

401. In a first signal sending time slot, sending two signals $U_A$ and $W_A$ to user terminal A through antenna 1, and sending two other signals $V_A$ and $X_A$ to the user terminal A through antenna 2, via two different preset subcarriers.

402. In a second signal sending time slot, sending two signals $U_B$ and $W_B$ to user terminal B through antenna 1, and sending two other signals $V_B$ and $X_B$ to the user terminal B through antenna 2, via two different preset subcarriers.

403. In a third signal sending time slot, sending public information signals $L(u, v)$ and $L(w, x)$ to the user terminals A and B through antenna 1 via the two different preset subcarriers.

404. In the third signal sending time slot, sending public information signals $-L^*(u, v)$ and $-L^*(w, x)$ to user terminals A and B through the antenna 2 via the two different preset subcarriers by using a space frequency block code (SPFC).

For example, refer to the 2×2 MU-MIMO system as shown in FIG. 3. For the 2×2 MU-MIMO, public information signals $L(u, v)$ and $L(w, x)$ are sent to the user terminals A and B through the antenna 1 via two different preset subcarriers in the third signal sending time slot, if SFBC is used, the public information signals $-L^*(u, v)$ and $-L^*(w, x)$ are sent to the user terminals A and B through the antenna 2 via the two different preset subcarriers in the third signal sending time slot, if SFBC is not used, no information needs to be sent through the antenna 2, thus MAT scheme performance can be enhanced further by introducing SFBC.

Figure 5:
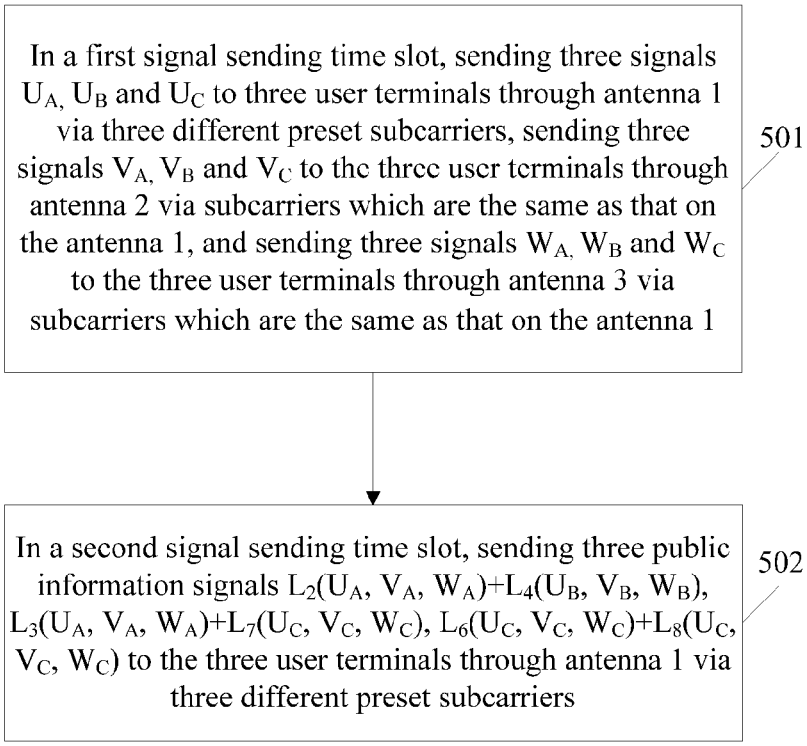
FIG. 5 is a schematic flowchart of a third specific implementation of the signal transmission method for a multiple-user multiple-input multiple-output system provided in FIG. 1.

Referring to FIG. 5, the present embodiment is a third specific implementation of the signal transmission method for multiple-user multiple-input multiple-output system. The signal transmission method for multiple-user multiple-input multiple-output system includes:

501. In a first signal sending time slot, sending three signals $U_A$, $U_B$ and $U_C$ to three user terminals through antenna 1 via three different preset subcarriers, sending three signals $V_A$, $V_B$ and $V_C$ to the three user terminals through antenna 2 via subcarriers which are the same as that on the antenna 1, and sending three signals $W_A$, $W_B$ and $W_C$ to the three user terminals through antenna 3 via subcarriers which are the same as that on the antenna 1.

502. In a second signal sending time slot, sending three public information signals $L_2(U_A, V_A, W_A)+L_4(U_B, V_B, W_B)$, $L_3(U_A, V_A, W_A)+L_7(U_C, V_C, W_C)$, $L_6(U_C, V_C, W_C)+L_8(U_C, V_C, W_C)$ to the three user terminals through antenna 1 via three different preset subcarriers.

Figure 6:
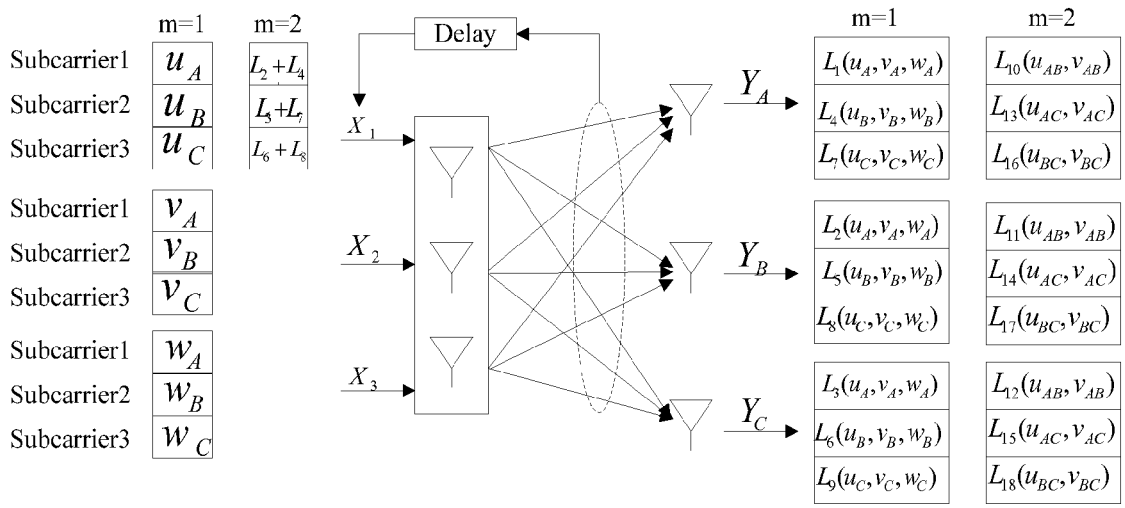
FIG. 6 is a 3×3 MU-MIMO system according to the present invention.

For example, refer to the 3×3 MU-MIMO system as shown in FIG. 6. As a possible implementation, for the 3×3 MU-MIMO, an eNodeB has three antennas corresponding to three user terminals A, B and C, where each of the three user terminals has one antenna respectively. The 3×3 MU-MIMO includes three signal sending time slots, and signals are sent to the user terminals via three preset subcarriers in each signal sending time slot. When there are three signals to be sent, the signals are simultaneously sent via three different sub-frequencies in one signal sending time slot, where, a quantity of the preset subcarriers is the same as that of the antennas.

In the first signal sending time slot, send three signals $U_A$, $U_B$ and $U_C$ to three user terminals through antenna 1 via three different preset subcarriers, send three signals $V_A$, $V_B$ and $V_C$ to the three user terminals through antenna 2 via subcarriers which are the same as that on the antenna 1, and send three signals $W_A$, $W_B$ and $W_C$ to the three user terminals through antenna 3 via subcarriers which are the same as that on the antenna 1.

In the second signal sending time slot, send three public information signals $L_2(U_A, V_A, W_A)+L_4(U_B, V_B, W_B)$, $L_3(U_A, V_A, W_A)+L_7(U_C, V_C, W_C)$, $L_6(U_C, V_C, W_C)+L_8(U_C, V_C, W_C)$ to the three user terminals through antenna 1 via three different preset subcarriers.

Optionally, for the antennas 2 and 3 which are idle in the second signal sending time slot, extra gain can be obtained by diversity.

For the 3×3 MU-MIMO, two signal sending time slots are included, and signals are sent to the user terminals via three preset subcarriers in each time slot, by way of frequency domain orthogonality, 9 symbols are sent on 3 subcarriers in two signal sending time slots. The degree of freedom is DoF=3/2.

It can be seen that, when the MAT scheme adopting time domain orthogonality is enhanced to adopt frequency domain orthogonality, only 2 signal sending time slots are needed to transmit 9 signals. That is, only 2 signal sending time slot needs to be delayed before the 9 signals being decoded, which is much less than that in the MAT scheme. In a condition that a channel changes rapidly, the reduction in the time delay is especially important.

Figure 7:
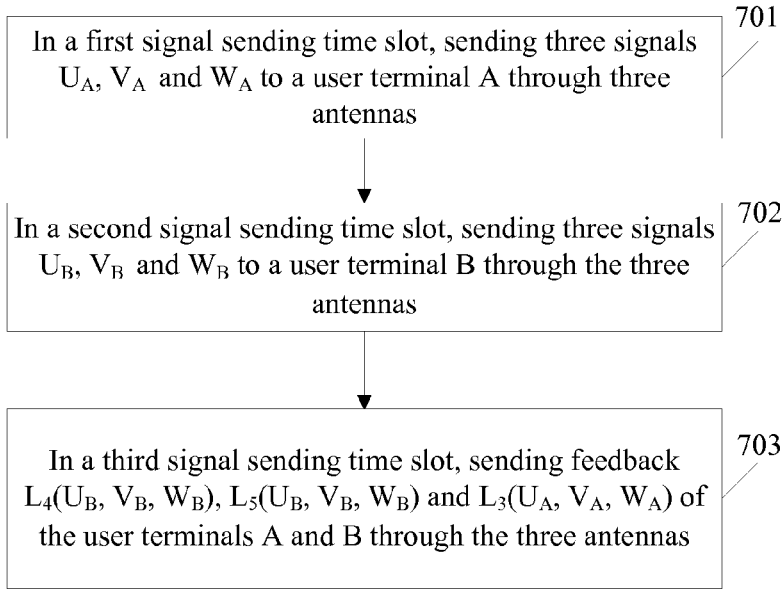
FIG. 7 is a schematic flowchart of a fourth specific implementation of the signal transmission method for a multiple-user multiple-input multiple-output system provided in FIG. 1.

Referring to FIG. 7, the present embodiment is a fourth specific implementation of the signal transmission method for a multiple-user multiple-input multiple-output system provided in FIG. 1. The signal transmission method for a multiple-user multiple-input multiple-output system includes:

701. In a first signal sending time slot, sending three signals $U_A$, $V_A$ and $W_A$ to a user terminal A through three antennas.

702. In a second signal sending time slot, sending three signals $U_B$, $V_B$ and $W_B$ to a user terminal B through the three antennas.

703. In a third signal sending time slot, sending feedback $L_4(U_B, V_B, W_B)$, $L_5(U_B, V_B, W_B)$ and $L_3(U_A, V_A, W_A)$ of the user terminals A and B through the three antennas.

Figure 8:
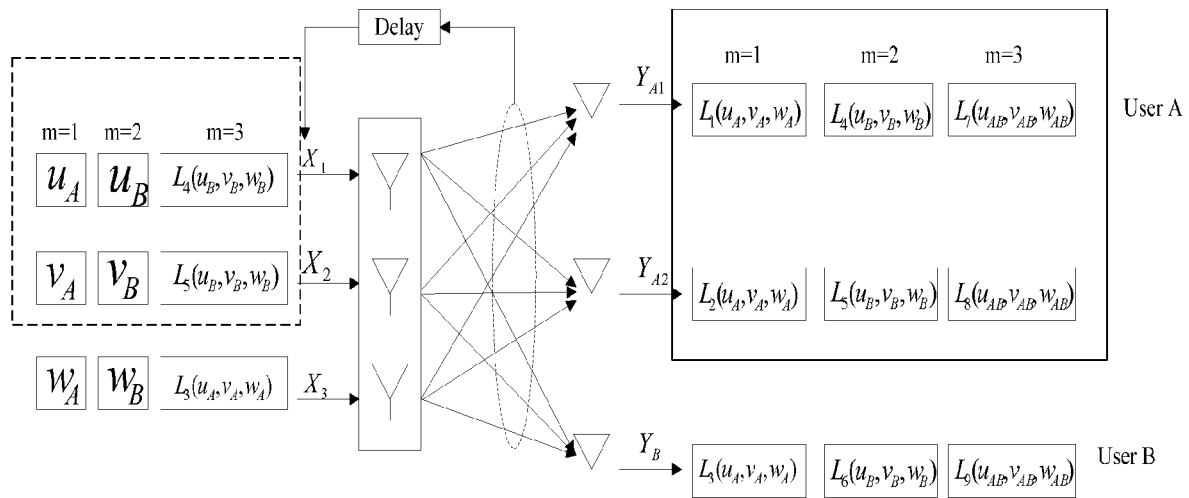
FIG. 8 is a MU-MIMO system with asymmetric antenna configuration according to the present invention.

For example, refer to the MU-MIMO system with asymmetric antenna configuration as shown in FIG. 8. As a possible implementation, corresponding to a 3×3 multiple-user multiple-input multiple-output system with asymmetric antenna configuration, the base station has three antennas corresponding to two user terminals A and B, where the user terminal A has two antennas and the user terminal B has one antenna, and where a quantity of the preset subcarriers is the same as that of the antennas.

In the first signal sending time slot, send three signals $U_A$, $V_A$ and $W_A$ to a user terminal A through three antennas.

In the second signal sending time slot, send three signals $U_B$, $V_B$ and $W_B$ to a user terminal B through the three antennas.

In the third signal sending time slot, send feedback $L_4(U_B, V_B, W_B)$, $L_5(U_B, V_B, W_B)$ and $L_3(U_A, V_A, W_A)$ of the user terminals A and B through the three antennas. Correspondingly, in a first signal receiving time slot, the user terminal A receives two information $L_1(U_A, V_A, W_A)$ and $L_2(U_A, V_A, W_A)$ related to the user terminal A itself, meanwhile, the user terminal B receives information $L_3(U_A, V_A, W_A)$ related to the user terminal A.

In a second signal receiving time slot, the user terminal A receives two information $L_4(U_B, V_B, W_B)$ and $L_5(U_B, V_B, W_B)$ related to the user terminal B, meanwhile, the user terminal B receives information $L_8(U_B, V_B, W_B)$ related to the user terminal B itself In a third signal receiving time slot, the user terminal A receives two public information $L_4(U_B, V_B, W_B)$, $L_7(U_{AB}, V_{AB}, W_{AB})$ and $L_8(U_{AB}, V_{AB}, W_{AB})$, and the user terminal B receives a public information $L_9(U_{AB}, V_{AB}, W_{AB})$.

Optionally, the above MAT scheme improvement solution based on frequency domain orthogonality and SFBC can both be used in the asymmetric antenna configuration, and can increase the flexibility of the whole system configuration.

For the 3×3 MU-MIMO with asymmetric antenna configuration, the base station has three antennas corresponding to the two user terminals A and B, where the user terminal A has two antennas and the user terminal B has one antenna, six signals of the user terminals A and B are sent via three signal sending time slots, furthermore, the user terminal A has two antennas, and the user terminal B has one terminal, so that the quantity configuration of user antennas is more flexible.

It can be seen that, according to the method provided by embodiments of the present invention, in a K×K multiple-user multiple-input multiple-output system, the original MAT scheme adopting time domain orthogonality is enhanced to adopt frequency domain orthogonality. In the signal sending time slot, send signals to the user terminals through each antenna via preset subcarriers, and in the public information sending time slots, send a first public information signal to the user terminals through each antenna via preset subcarriers, thus the delay of decoding data by the user terminal is decreased, the MAT scheme is combined with the SFBC, thus the MAT scheme performance is further improved. The MAT scheme for asymmetric antenna configuration can be used in MU-MIMO system in which the multiple UEs with different quantity of antennas are joint scheduled, thereby greatly increasing the flexibility of the system configuration.

Figure 9:
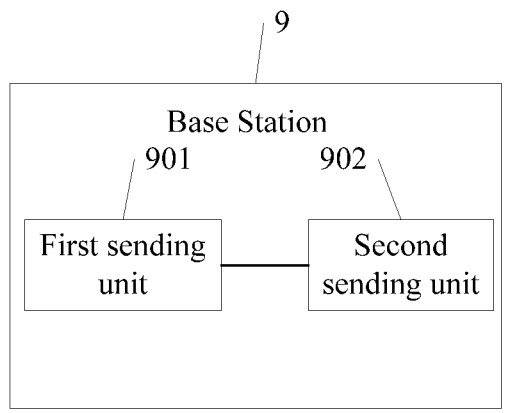
FIG. 9 is a base station according to an embodiment of the present invention.

Referring to FIG. 9, a base station according to an embodiment of the present invention, includes:

a first sending unit 901, configured to send a signal to user terminals through each antenna via preset subcarriers in a signal sending time slot;

a second sending unit 902, configured to send a first public information signal to the user terminals through each antenna via the preset subcarriers in a public information sending time slot.

For a K×K MU-MIMO system, in a signal sending time slot of the first sending unit 901, send a signal to user terminals through each antenna via preset subcarriers, in a public information sending slot of the second sending unit 902, send a first public information signal to the user terminals through each antenna via the preset subcarriers. Where, a quantity of the preset subcarriers is the same as that of the antennas.

Figure 10:
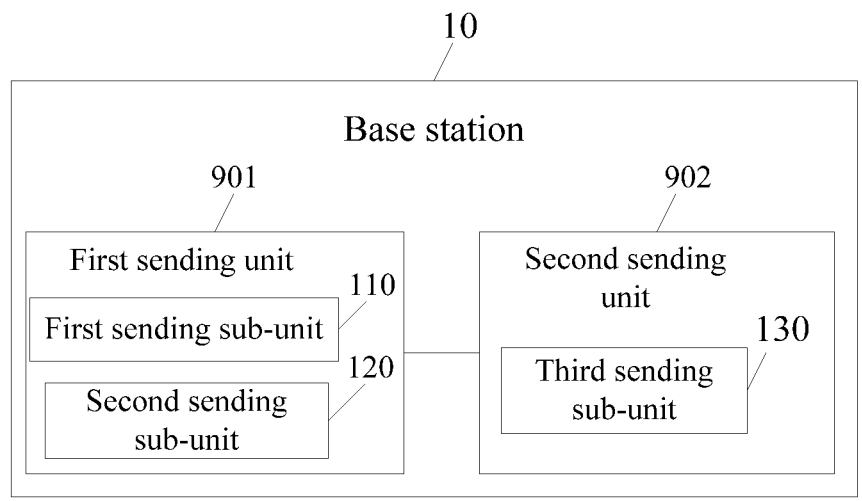
FIG. 10 is a schematic structure diagram of a first specific implementation of the base station provided in FIG. 9.

Optionally, referring to FIG. 10, the first sending unit 901 includes:

A first sending sub-unit 110, configured to send two signals $U_A$ and $W_A$ to user terminal A through antenna 1, and send two other signals $V_A$ and $X_A$ to the user terminal A through antenna 2, via two different preset subcarriers in a first signal sending time slot;

A second sending sub-unit 120, configured to send two signals $U_B$ and $W_B$ to user terminal B through antenna 1, and send two other signals $V_B$ and $X_B$ to the user terminal B through antenna 2, via two different preset subcarriers in a second signal sending time slot.

The second sending unit 902 includes:

A third sending sub-unit 130, configured to send first public information signals $L(u, v)$ and $L(w, x)$ to the user terminals A and B through antenna 1 via the two different preset subcarriers in a third signal sending time slot.

As a possible implement, for a 2×2 MU-MIMO, an eNodeB has two antennas corresponding to the two user terminals A and B, where each of the two user terminals has one antenna respectively. The 2×2 MU-MIMO includes two signal sending time slots corresponding to the first sending unit 901 and the second sending unit 902, and signals are send to the user terminals via two preset subcarriers in each signal sending time slot. Two subcarriers are involved in each signal sending time slot, and frequency domain orthogonality is changed to time domain orthogonality, the first sending unit 901 includes a first sending sub-unit 110 and a second sending sub-unit 120, the second sending unit 902 includes a third sending sub-unit 130. When there are two signals to be sent, the signals are simultaneously sent via two different sub-frequencies in one signal sending time slot.

According to the present invention, eight signals are sent to the user terminals A and B via two subcarriers by using three signal sending time slots, that is, before the eight signals of the user terminals A and B being decoded, only three time slots at least need to be delayed, thus delay of decoding data by the user terminal is reduced.

Figure 11:
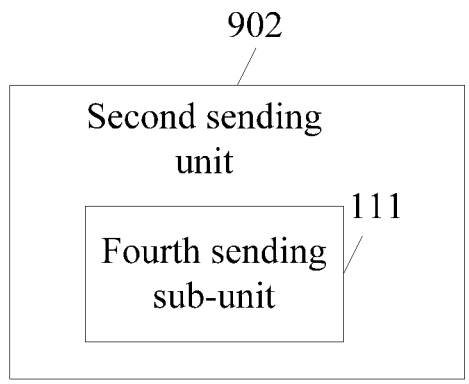
FIG. 11 is a schematic structure diagram of a second specific implementation of the base station provided in FIG. 10.

Optionally, referring to FIG. 11, the second sending unit 902 includes:

A fourth sending sub-unit 111, configured to send second public information signals $-L^*(u, v)$ and $-L^*(w, x)$ to user terminals A and B through the antenna 2 via the two different preset subcarriers by using a space frequency block code (SPFC) in the third signal sending time slot.

As a possible implement, for a 2×2 MU-MIMO, public information signals $L(u, v)$ and $L(w, x)$ are sent to the user terminals A and B through the antenna 1 via two different preset subcarriers in the third signal sending time slot, if SFBC is used, the public information signals $-L^*(u, v)$ and $-L^*(w, x)$ are sent to the user terminals A and B through the antenna 2 via the two different preset subcarriers in the third signal sending time slot by the fourth sending sub-unit 111, if SFBC is not used, no information needs to be sent through the antenna 2, thus MAT scheme performance can be enhanced further by introducing SFB.

Figure 12:
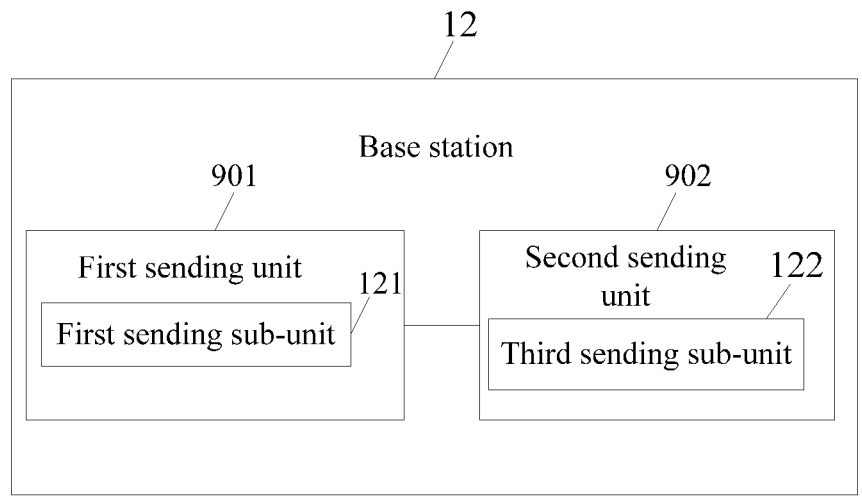
FIG. 12 is a schematic structure diagram of a second specific implementation of the base station provided in FIG. 9.

Optionally, referring to FIG. 12, the first sending unit 901 includes:

A first sending sub-unit 121, configured to, in a first signal sending time slot, send three signals $U_A$, $U_B$ and $U_C$ to three user terminals through antenna 1 via three different preset subcarriers, sending three signals $V_A$, $V_B$ and $V_C$ to the three user terminals through antenna 2 via subcarriers which are the same as that on the antenna 1, and send three signals $W_A$, $W_B$ and $W_C$ to the three user terminals through antenna 3 via subcarriers which are the same as that on the antenna 1.

The second sending unit 902 includes:

A second sending sub-unit 122, configured to, in a second signal sending time slot, send three public information signals $L_2(U_A, V_A, W_A)+L_4(U_B, V_B, W_B)$, $L_3(U_A, V_A, W_A)+L_7(U_C, V_C, W_C)$ and $L_6(U_C, V_C, W_C)+L_8(U_C, V_C, W_C)$ to the three user terminals through antenna 1 via three different preset subcarriers.

As a possible implement, for a 3×3 MU-MIMO, an eNodeB has three antennas corresponding to three user terminals A, B and C, where each of the three user terminals has one antenna respectively. The 3×3 MU-MIMO includes three signal sending time slots, and signals are sent to the user terminals via three preset subcarriers in each signal sending time slot. When there are three signals to be sent, the signals are simultaneously sent via three different sub-frequencies in one signal sending time slot, where, a quantity of the preset subcarriers is the same as that of the antennas.

In the first signal sending time slot, the first sending sub-unit 121 sends three signals $U_A$, $U_B$ and $U_C$ to three user terminals through antenna 1 via three different preset subcarriers, sends three signals $V_A$, $V_B$ and $V_C$ to the three user terminals through antenna 2 via subcarriers which are the same as that on the antenna 1, and sends three signals $W_A$, $W_B$ and $W_C$ to the three user terminals through antenna 3 via subcarriers which are the same as that on the antenna 1.

In the second signal sending time slot, the second sending sub-unit 122 sends three public information signals $L_2(U_A, V_A, W_A)+L_4(U_B, V_B, W_B)$, $L_3(U_A, V_A, W_A)+L_7(U_C, V_C, W_C)$, $L_6(U_C, V_C, W_C)+L_8(U_C, V_C, W_C)$ to the three user terminals through antenna 1 via three different preset subcarriers.

Optionally, for the antennas 2 and 3 which are idle in the second signal sending time slot, extra gain can be obtained by diversity.

For the 3×3 MU-MIMO, two signal sending time slots are included, and signals are sent to the user terminals via three preset subcarriers in each time slot, by way of frequency domain orthogonality, 9 symbols are sent on 3 subcarriers in two signal sending time slots. The degree of freedom is DoF=3/2.

It can be seen that, when the MAT scheme adopting time domain orthogonality is enhanced to adopt frequency domain orthogonality, only 2 signal sending time slots are needed to transmit 9 signals. That is, only 2 signal sending time slot needs to be delayed before the 9 signals being decoded, which is much less than that in the MAT scheme. In a condition that a channel changes rapidly, the reduction in the time delay is especially important.

Figure 13:
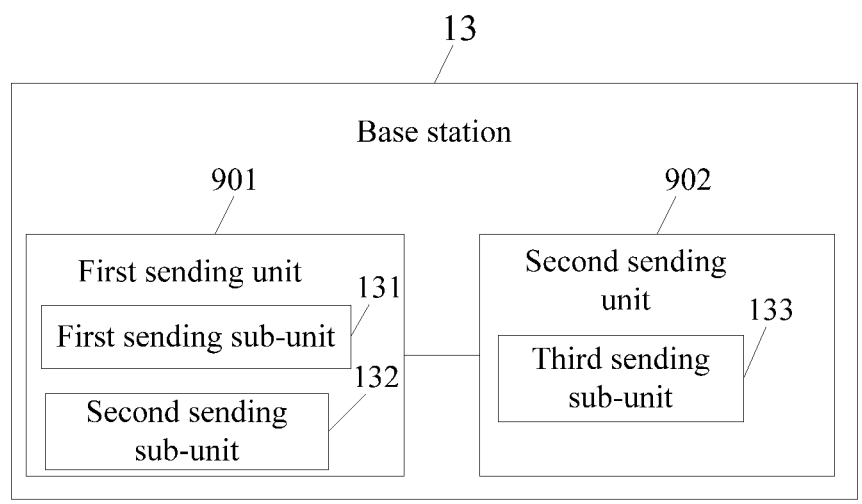
FIG. 13 is a schematic structure diagram of a third specific implementation of the base station provided in FIG. 9.

Optionally, referring to FIG. 13, the first sending unit 901 includes:

A first sending sub-unit 131, configured to send three signals $U_A$, $V_A$ and $W_A$ to a user terminal A through three antennas in the first signal sending time slot;

A second sending sub-unit 132, configured to send three signals $U_B$, $V_B$ and $W_B$ to a user terminal B through the three antennas in the second signal sending time slot.

The second sending unit 902 includes:

A third sending sub-unit 133, configured to send feedback $L_4(U_B, V_B, W_B)$, $L_5(U_B, V_B, W_B)$ and $L_3(U_A, V_A, W_A)$ of the user terminals A and B through the three antennas in the third signal sending time slot.

As a possible implementation, corresponding to a 3×3 multiple-user multiple-input multiple-output system with asymmetric antenna configuration, the base station has three antennas corresponding to two user terminals A and B, where the user terminal A has two antennas and the user terminal B has one antenna, and where a quantity of the preset subcarriers is the same as that of the antennas.

In the first signal sending time slot, the first sending sub-unit 131 sends three signals $U_A$, $V_A$ and $W_A$ to a user terminal A through three antennas.

In the second signal sending time slot, the second sending sub-unit 132 sends three signals $U_B$, $V_B$ and $W_B$ to a user terminal B through the three antennas.

In the third signal sending time slot, the third sending sub-unit 133 sends feedback $L_4(U_B, V_B, W_B)$, $L_5(U_B, V_B, W_B)$ and $L_3(U_A, V_A, W_A)$ of the user terminals A and B through the three antennas.

Optionally, the above MAT scheme improvement solution based on frequency domain orthogonality and SFBC can both be used in the asymmetric antenna configuration, and can increase the flexibility of the whole system configuration.

For the 3×3 MU-MIMO with asymmetric antenna configuration, the base station has three antennas corresponding to the two user terminals A and B, where the user terminal A has two antennas and the user terminal B has one antenna, six signals of the user terminals A and B are sent via two signal sending time slots, furthermore, the user terminal A has two antennas, and the user terminal B has one terminal, so that the quantity configuration of user antennas is more flexible.

It can be seen that, according to the method provided by embodiments of the present invention, in a K×K multiple-user multiple-input multiple-output system, the original MAT scheme adopting time domain orthogonality is enhanced to adopt frequency domain orthogonality. In the signal sending time slot, send signals to the user terminals through each antenna via preset subcarriers, and in the public information sending time slots, send a first public information signal to the user terminals through each antenna via preset subcarriers, thus the delay of decoding data by the user terminal is decreased, the MAT scheme is combined with the SFBC, thus the MAT scheme performance is further improved. The MAT scheme for asymmetric antenna configuration can be used in MU-MIMO system in which the multiple UEs with different quantity of antennas are joint scheduled, thereby greatly increasing the flexibility of the system configuration.

It can be seen that, according to the method provided by embodiments of the present invention, in a K×K multiple-user multiple-input multiple-output system, the original MAT scheme adopting time domain orthogonality is enhanced to adopt frequency domain orthogonality. In the signal sending time slot, the first sending unit 901 sends signals to the user terminals through each antenna via preset subcarriers, and in the public information sending time slots, the second sending unit 902 sends a first public information signal to the user terminals through each antenna via preset subcarriers, thus the delay of decoding data by the user terminal is decreased, the MAT scheme is combined with the SFBC, thus the MAT scheme performance is further improved. The MAT scheme for asymmetric antenna configuration can be used in MU-MIMO system in which the multiple UEs with different quantity of antennas are joint scheduled, thereby greatly increasing the flexibility of the system configuration.

Figure 14:
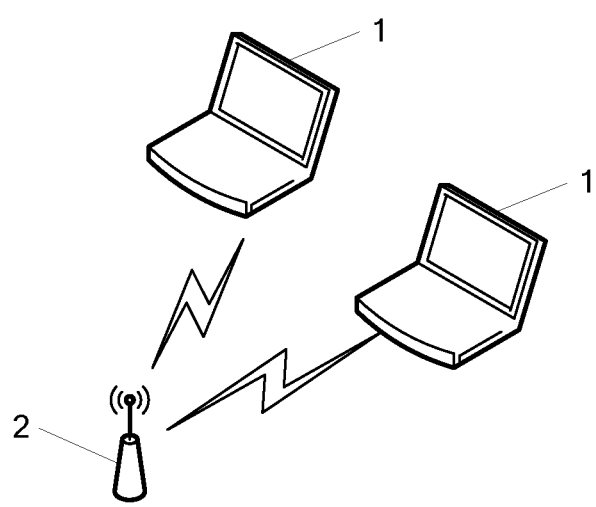
FIG. 14 is a schematic structure diagram of a multiple-user multiple-input multiple-output signal transmission system according to an embodiment of the present invention.

Referring to FIG. 14, the present embodiment provides a signal transmission system for a multiple-user multiple-input multiple-output system. The signal transmission system for a multiple-user multiple-input multiple-output system includes the base station 2 and the user terminal 1 as shown in FIG. 6.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium may be a magnetic disk, an optical disc, a read-only memory (ROM), or a random access memory (RAM).

Finally, it should be noted that the foregoing embodiments are merely some preferable embodiments of the technical solutions of the present invention, and cannot be used to define the protection scope of the present invention. A person of ordinary skill in the art should understand that any equivalent change which implements all or part of procedures of the above embodiment and is made according to the claims of the present invention belongs to the protection scope of the present invention.

What is claimed is:

1. A signal transmission method for a multiple-user multiple-input multiple-output system, comprising a base station having a plurality of antennas, sending a plurality of signals through each respective antenna utilizing a plurality of preset subcarriers over sequential time slots, the base station further comprises at least a processor executing program codes stored in a memory, which configure the base station to perform the functions in the method, comprising:
 in a first signal sending time slot:
  sending a first and a second signal pertaining to a first user terminal through a first antenna via a first and a second preset subcarrier, respectively;
  sending a third and a fourth signal pertaining to the first user terminal through a second antenna via a third and a fourth preset subcarrier, respectively;
 in a second signal sending time slot:
  sending a fifth and a sixth signal pertaining to a second user terminal through the first antenna via the first and the second preset subcarrier, respectively;
  sending a seventh and an eighth signal pertaining to the second user terminal through the second antenna via the third and the fourth preset subcarrier, respectively;
 afterwards, sending first respective public information signals pertaining to the plurality of preset subcarriers to the first and the second user terminals through the first and the second antennas via the respective first, second third and fourth preset subcarriers in a public information sending time slot;
 wherein a quantity of preset subcarriers utilized by each respective antenna is the same quantity as that of the plurality of antennas used for signal transmission.

2. The method according to claim 1, wherein the multiple-user multiple-input multiple-output system comprises a 2×2 system, the quantity of preset subcarriers corresponding to the quantity of the antennas comprises two subcarriers, the sending of the first signal pertaining to the first user terminal through the first antenna via the first and the second preset subcarriers in the first signal sending time slot, comprises:
 sending two signals $U_A$ and $W_A$ to the first user terminal as user terminal A through the first antenna as antenna 1 via the first and the second preset subcarriers, and sending two other signals $V_A$ and $X_A$ to the user terminal A through the second antenna as antenna 2, via two different preset subcarriers as the third and the fourth preset subcarrier in the first signal sending time slot;
 sending two signals $U_B$ and $W_B$ to the second user terminal as user terminal B through the antenna 1 via the first and the second preset subcarriers, and sending two other signals $V_B$ and $X_B$ to the user terminal B through the antenna 2, via two different preset subcarriers as the third and the fourth preset subcarrier in the second signal sending time slot.

3. The method according to claim 2, wherein the sending of the first respective public information signals pertaining to the plurality of preset subcarriers to the first and the second user terminals through the first and the second antennas via the respective first, second third and fourth preset subcarriers in the public information sending time slot, comprises:
 sending first public information signals $L(u, v)$ and $L(w, x)$ to the user terminals A and B through the antenna 1, via the first and the second preset subcarriers in a third signal sending time slot.

4. The method according to claim 3, further comprising:
 sending second public information signals $-L^*(u, v)$ and $-L^*(w, x)$ to the user terminals A and B through the antenna 2 via the third and the fourth preset subcarriers by using a space frequency block code (SPFC) in the third signal sending time slot.

5. The method according to claim 1, wherein the multiple-user multiple-input multiple-output system comprises a 3×3 system, the plurality of preset subcarriers corresponding to the quantity of the antennas comprises three subcarriers, the sending of the first signal pertaining to the first user terminal through the first antenna via the first and the second preset subcarriers in the first signal sending time slot, comprises:
 in the first signal sending time slot, sending three signals $U_A$, $U_B$ and $U_C$ to three respective user terminals through the first antenna as antenna 1 via three different preset subcarriers, sending three signals $V_A$, $V_B$ and $V_C$ to the three respective user terminals through the second antenna as antenna 2 via subcarriers which are the same as that on the antenna 1, and sending three signals $W_A$, $W_B$ and $W_C$ to the three user terminals through a third antenna as antenna 3 via three respective preset different subcarriers which are the same as that on the antenna 1.

6. The method according to claim 5, wherein the sending of the first respective public information signal to the three respective user terminals through each antenna via the three respective preset different subcarriers in the public information sending time slot, comprises:
 sending three public combination information signals $L_2(U_A, V_A, W_A)+L_4(U_B, V_B, W_B)$, $L_3(U_A, V_A, W_A)+L_7(U_C, V_C, W_C)$ and $L_6(U_C, V_C, W_C)+L_8(U_C, V_C, W_C)$ to three respective user terminals through the antenna 1 via the three respective different preset subcarriers in the second signal sending time slot, wherein the three public combination information signals $L_2(U_A, V_A, W_A)+L_4(U_B, V_R, W_B)$, $L_3(U_A, V_A, W_A)+L_7(U_C, V_C, W_C)$ and $L_6(U_C, V_C, W_C)+L_8(U_C, V_C, W_C)$ are respective feedback signals related to the three respective terminals A, B and C.

7. The method according to claim 1, wherein the multiple-user multiple-input multiple-output system comprises a 3×3 system with asymmetric antenna configuration, the quantity of preset subcarriers corresponding to the quantity of the antennas comprises three subcarriers, the sending of the plurality of signals to three user terminals through each of the three respective antennas via three respective preset subcarriers in the sequential signal sending time slots, comprises:
 sending three signals $U_A$, $V_A$ and $W_A$ to a user terminal A through the three respective antennas in the first signal sending time slot;
 sending three other signals $U_B$, $V_B$ and $W_B$ to a user terminal B through the three respective antennas in the second signal sending time slot;
 sending feedback information $L_4(U_B, V_B, W_B)$, $L_5(U_B, V_B, W_B)$ and $L_3(U_A, V_A, W_A)$ of the user terminals A and B through the three respective antennas in the third signal sending time slot.

8. A base station for a multiple-user multiple-input multiple-output system, comprising a plurality of antennas, sending a plurality of signals through each respective antenna utilizing a plurality of preset subcarriers over sequential time slots, the base station further comprises at least a processor executing program codes stored in a memory, which configure the base station to:
- in a first signal sending time slot:
  - send a first and a second signal pertaining to a first user terminal through a first antenna via a first and a second preset subcarrier, respectively;
  - send a third and a fourth signal pertaining to the first user terminal through a second antenna via a third and a fourth preset subcarrier, respectively;
- in a second signal sending time slot:
  - send a fifth and a sixth signal pertaining to a second user terminal through the first antenna via the first and the second preset subcarrier, respectively;
  - send a seventh and an eighth signal pertaining to the second user terminal through the second antenna via the third and the fourth preset subcarrier, respectively;
- afterwards, send first respective public information signals pertaining to the plurality of preset subcarriers to the first and the second user terminals through the first and the second antennas via the respective first, second third and fourth preset subcarriers in a public information sending time slot;
- wherein a quantity of preset subcarriers utilized by each respective antenna is the same quantity as that of the plurality of antennas used for signal transmission.

9. The base station for a multiple-user multiple-input multiple-output system according to claim 8, wherein, corresponding to a 2×2 multiple-user multiple-input multiple-output system, the base station comprises two antennas corresponding to two user terminals A and B, wherein each of the two user terminals has one antenna respectively, the base station is further configured to:
- send two signals $U_A$ and $W_A$ to the first user terminal as the user terminal A through the first antenna as antenna 1 via the first and the second preset subcarriers, and send two other signals $V_A$ and $X_A$ to the user terminal A through the second antenna as antenna 2, via two different preset subcarriers as the third and the fourth preset subcarrier in the first signal sending time slot;
- send two signals $U_B$ and $W_B$ to the second user terminal as the user terminal B through the antenna 1 via the first and the second preset subcarriers, and send two other signals $V_B$ and $X_B$ to the user terminal B through the antenna 2, via two different preset subcarriers as the third and the fourth preset subcarrier in the second signal sending time slot.

10. The base station for a multiple-user multiple-input multiple-output system according to claim 9, wherein the base station is further configured to:
- send first public information signals L(u, v) and L(w, x) to the user terminals A and B through the antenna 1 via the first and the second preset subcarriers in a third signal sending time slot.

11. The base station for a multiple-user multiple-input multiple-output system according to claim 10, wherein base station is further configured to:

- send second public information signals −L*(u, v) and −L*(w, x) to the user terminals A and B through the antenna 2 via the third and the fourth preset subcarriers by using a space frequency block code (SPFC) in the third signal sending time slot.

12. The base station for a multiple-user multiple-input multiple-output system according to claim 8, wherein, corresponding to a 3×3 multiple-user multiple-input multiple-output system, the base station comprises three antennas corresponding to three user terminals A, B and C, wherein each of the three user terminals has one antenna respectively, the base station is further configured to:
- in the first signal sending time slot, send three signals $U_A$, $U_B$ and $U_C$ to the three respective user terminals through the first antenna as antenna 1 via three different preset subcarriers, send three signals $V_A$, $V_B$ and $V_C$ to the three respective user terminals the second antenna as antenna 2 via subcarriers which are the same as that on the antenna 1, and send three signals $W_A$, $W_B$ and $W_C$ to the three user terminals through a third antenna as antenna 3 via three respective preset different subcarriers which are the same as that on the antenna 1.

13. The base station for a multiple-user multiple-input multiple-output system according to claim 12, wherein the base station is further configured to:
- in the second signal sending time slot, send three public information signals $L_2(U_A, V_A, W_A)+L_4(U_B, V_B, W_B)$, $L_3(U_A, V_A, W_A)+L_7(U_C, V_C, W_C)$ and $L_6(U_C, V_C, W_C)+L_8(U_C, V_C, W_C)$ to the three respective user terminals through the antenna 1 via the three different respective preset subcarriers wherein the three public combination information signals $L_2(U_A, V_A, W_A)+L_4(U_B, V_B, W_B)$, $L_3(U_A, V_A, W_A)+L_7(U_C, V_C, W_C)$ and $L_6(U_C, V_C, W_C)+L_8(U_C, V_C, W_C)$ are respective feedback signals related to the three respective terminals A, B and C.

14. The base station for a multiple-user multiple-input multiple-output system according to claim 8, wherein, corresponding to a 3×3 multiple-user multiple-input multiple-output system, the base station comprises three antennas corresponding to two user terminals A and B, wherein the user terminal A has two antennas, and the user B has one antenna, the base station is further configured to:
- send three signals $U_A$, $V_A$ and $W_A$ to the user terminal A through the three respective antennas in the first signal sending time slot; and
- send three other signals $U_B$, $V_B$ and $W_B$ to the user terminal B through the three respective antennas in the second signal sending time slot.

15. The base station for a multiple-user multiple-input multiple-output system according to claim 14, wherein the base station is further configured to:
- send feedback $L_4(U_B, V_B, W_B)$, $L_5(U_B, V_B, W_B)$ and $L_3(U_A, V_A, W_A)$ of the user terminals A and B through the three respective antennas in the third signal sending time slot.

16. A signal transmission system for a multiple-user multiple-input multiple-output system, comprising a base station and user terminals, wherein the base station comprises the base station according to claim 8.

* * * * *